(12) United States Patent
Kato et al.

(10) Patent No.: US 11,726,731 B2
(45) Date of Patent: Aug. 15, 2023

(54) IMAGE FORMING APPARATUS

(71) Applicant: KYOCERA Document Solutions Inc., Osaka (JP)

(72) Inventors: Ryosuke Kato, Osaka (JP); Keisuke Fukushima, Osaka (JP); Shigenaka Kanemitsu, Osaka (JP); Yasushi Tsukamoto, Osaka (JP); Akihiko Ikazaki, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/684,923

(22) Filed: Mar. 2, 2022

(65) Prior Publication Data

US 2022/0283764 A1   Sep. 8, 2022

(30) Foreign Application Priority Data

Mar. 4, 2021   (JP) .................................. 2021-034215

(51) Int. Cl.
*G06F 3/12*   (2006.01)

(52) U.S. Cl.
CPC .......... *G06F 3/1267* (2013.01); *G06F 3/1204* (2013.01); *G06F 3/126* (2013.01); *G06F 3/1259* (2013.01)

(58) Field of Classification Search
None
See application file for complete search history.

(56) References Cited

U.S. PATENT DOCUMENTS

| 2019/0018621 A1* | 1/2019 | Akahira | G06F 3/1204 |
| 2019/0312991 A1* | 10/2019 | Manabe | H04N 1/2338 |
| 2022/0021781 A1* | 1/2022 | Iwasaki | G06F 3/1222 |

FOREIGN PATENT DOCUMENTS

JP   2010-028172   2/2010

* cited by examiner

*Primary Examiner* — Frantz Bataille

(57) ABSTRACT

In an image forming apparatus, a communication device performs data communication with an external user terminal apparatus, and a job managing unit receives a print job request from the user terminal apparatus using the communication device. Further, when receiving the print job request from the user terminal apparatus, the job managing unit determines whether there is a user who is physically directly using the image forming apparatus or not, if there is not a user who is physically directly using the image forming apparatus, allows the print job request and if there is a user who is physically directly using the image forming apparatus, determines whether the print job request should be refused or not, and if the print job request should not be refused, allows the print job request and if the print job request should be refused, refuses the print job request.

5 Claims, 3 Drawing Sheets

IMAGE FORMING APPARATUS

CROSS-REFERENCE TO RELATED APPLICATIONS

This application relates to and claims priority rights from Japanese Patent Application No. 2021-034215, filed on Mar. 4, 2021, the entire disclosures of which are hereby incorporated by reference herein.

BACKGROUND

1. Field of the Present Disclosure

The present disclosure relates to an image forming apparatus.

2. Description of the Related Art

When an image forming apparatus receives a print job from an external device, if the image forming apparatus is in maintenance operation, then the image forming apparatus decides to refuse the print job on the basis of details of the maintenance operation.

For infection prevention against COVID-19, people require to ensure social distance. Regarding an image forming apparatus such as multi function peripheral that can be used by plural users, it is likewise favorable that a user avoids coming to the image forming apparatus (e.g. for picking up a printed matter) when another user is physically directly using the image forming apparatus.

Although the aforementioned image forming apparatus refuses a print job under a specific condition, the aforementioned image forming apparatus hardly determines whether a print job of a user from an external device should be refused or not on the basis of whether another user is physically directly using the image forming apparatus or not.

SUMMARY

An image forming apparatus according to an aspect of the present disclosure includes a communication device and a job managing unit. The communication device is configured to perform data communication with an external user terminal apparatus. The job managing unit is configured to receive a print job request from the user terminal apparatus using the communication device. Further, when receiving the print job request from the user terminal apparatus, the job managing unit (a) determines whether there is a user who is physically directly using the image forming apparatus or not, (b1) if there is not a user who is physically directly using the image forming apparatus, allows the print job request and (b2) if there is a user who is physically directly using the image forming apparatus, determines whether the print job request should be refused or not, and (c1) if the print job request should not be refused, allows the print job request and (c2) if the print job request should be refused, refuses the print job request.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
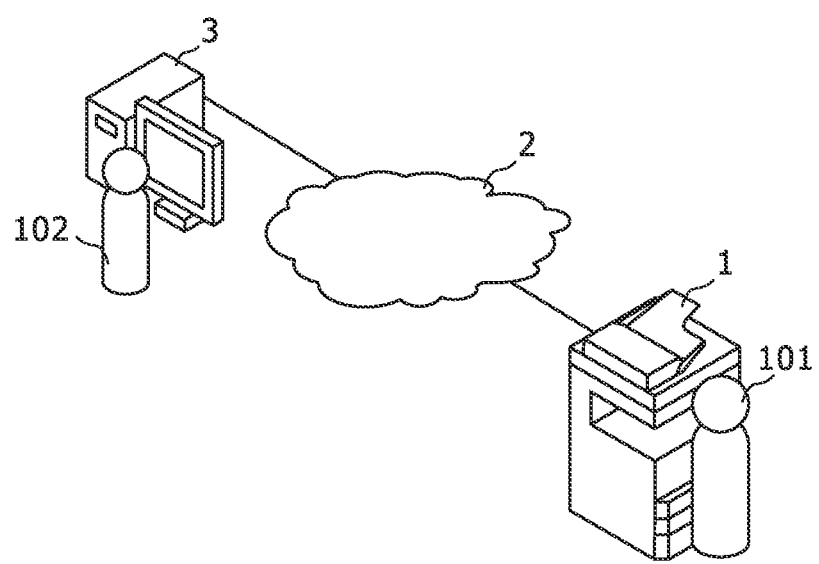
FIG. 1 shows a diagram that indicates a configuration of an image forming system that includes an image forming apparatus according to an embodiment of the present disclosure.
Figure 2:
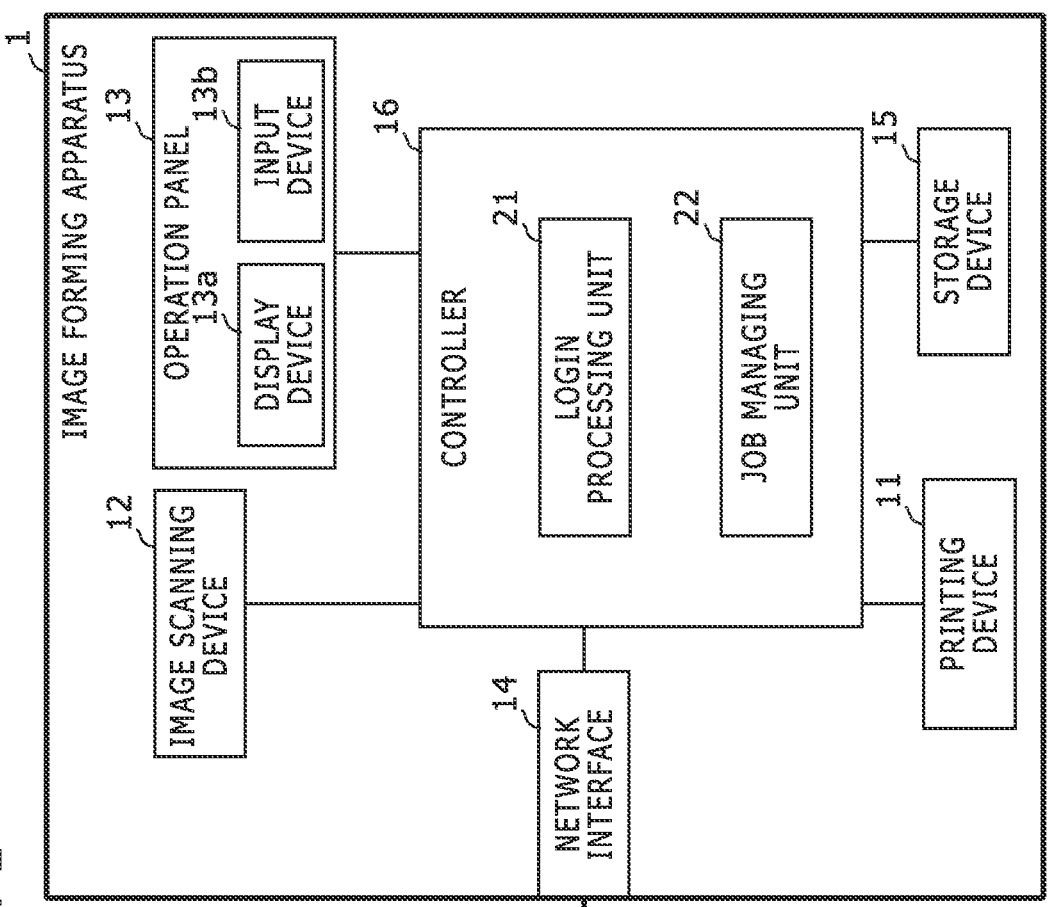
FIG. 2 shows a block diagram that indicates configurations of the image forming apparatus and a user terminal apparatus shown in FIG. 1.
Figure 2:
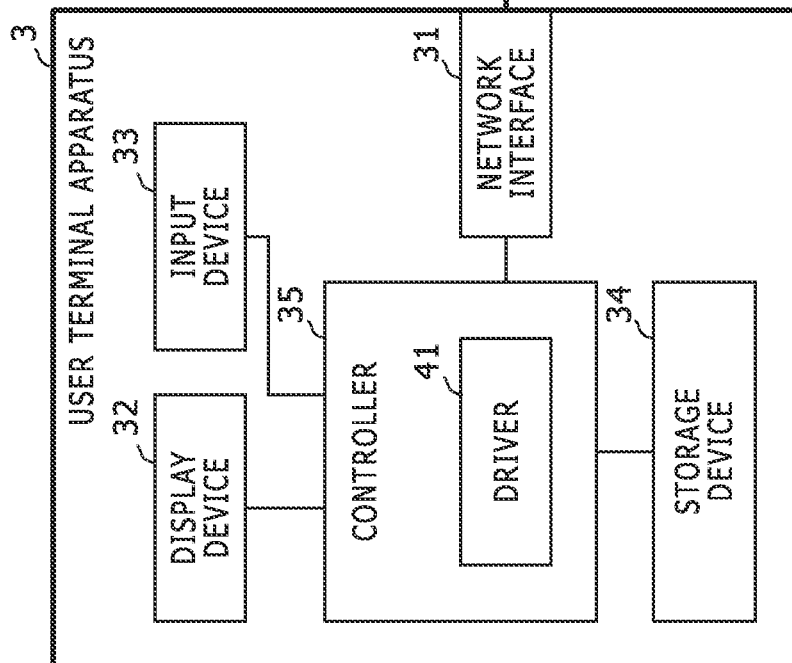

FIG. 1 shows a diagram that indicates a configuration of an image forming system that includes an image forming apparatus according to an embodiment of the present disclosure. FIG. 2 shows a block diagram that indicates configurations of the image forming apparatus and a user terminal apparatus shown in FIG. 1.

The system shown in FIG. 1 includes an image forming apparatus 1 (e.g. a multi function peripheral, a printer, a copier or the like) available to plural users, and a user terminal apparatus 3 (e.g. a personal computer or the like) that transmits a print job request through a network 2 or the like to the image forming apparatus 1.

As shown in FIG. 2, the image forming apparatus 1 is a multi function peripheral or the like available to plural users, and includes a printing device 11, an image scanning device 12, an operation panel 13, a network interface 14, a storage device 15, and a controller 16.

The printing device 11 is an internal device that prints on a print paper sheet an image specified by the print job request (e.g. in accordance with an electrophotographic printing matter). The image scanning device 12 is an internal device that optically scans a document image of a document and generates image data of the document image.

A print job based on a print job request from the user terminal apparatus 3, the operation panel 13 of the image forming apparatus 1 or the like is performed using the printing device 11. Further, a copy job based on a copy job request the operation panel 13 of the image forming apparatus 1 or the like is performed using the image scanning device 12 and the printing device 11.

The operation panel 13 is arranged on a surface of a housing of the image forming apparatus 1, and includes a display device 13a that displays sorts of messages to a user and an input device 13b that receives a user operation. For example, a liquid crystal display is used as the display device 13a. A hard key, a touch panel and/or the like are/is used as the input device 13b.

The operation panel 13 displays an operation screen and the like using the display device 13a, to a user who is physically directly using the image forming apparatus 1, and detects a user operation by the user using the input device 13a.

The network interface 14 is a communication device that is connected to a network 2 such as a wireless LAN (Local Area Network) or a wired LAN, and performs data communication with an external device (the user terminal apparatus 3, an unshown server, or the like) connected to the network 2.

Further, the storage device 15 is a nonvolatile storage device such as a flash memory or a hard disk. In the storage device 15, a program, data and the like required for a process mentioned below have been stored.

Further, in accordance with a job request based on a user operation to the operation panel 13 or a job request received by the network interface 14, the controller 16 performs data processing if required, and controls an internal device of the image forming apparatus 1 and thereby performs the requested job (e.g. a print job, a copy job, a facsimile transmission job, or the like). The controller 16 includes a computer, an ASIC (Application Specific Integrated Circuit) and/or the like, and acts as sorts of processing units based on a software process and/or a hardware process performed by the computer and/or the ASIC. Here the controller 16 acts as a login processing unit 21 and a job managing unit 22.

The login processing unit 21 displays a login screen on the operation panel 13 when the image forming apparatus 1 starts, determines user identification information (e.g. a user ID, a pair of a user ID and a password, or the like) inputted to the login screen on the operation panel 13, and performs a user authentication process for this user on the basis of the user identification information; and if the user authentication for this user succeeded, the login processing unit 21 allows the user to log-in and displays a menu screen for the user to instruct sorts of job requests, and otherwise if the user authentication for this user failed, the login processing unit 21 refuses the user to log-in and continues to display the login screen. Further, when the user performs a logout operation after logging-in, the login processing unit 21 displays the login screen again.

It should be noted that the login processing unit 21 may perform the aforementioned user authentication on the basis of user registration data (user identification information, property information and/or the like of registered users) stored in this image forming apparatus 1, or using the network interface 14, may access an external authentication server that manages user registration data and perform the aforementioned user authentication using the authentication server. This authentication server may be a resource management server such as Active Directory server.

Further, this property information includes a user group to which registered users belongs. In this embodiment, for example, the user group is a user group of users who work physically closely to each other such as (a) users for which seats in an office are arranged adjacently or (b) users who work in a single room.

The job managing unit 22 receives a print job request from the user terminal apparatus 3 using the network interface 14.

Further, when receiving a print job request from the user terminal apparatus 3, the job managing unit 22 (a) determines whether there is a user 101 who is physically directly using the image forming apparatus 1 (i.e. a user allowed to login, as mentioned) or not, (b1) if there is not a user 101 who is physically directly using the image forming apparatus, allows the print job request and (b2) if there is a user 101 who is physically directly using the image forming apparatus 1, determines whether the print job request should be refused or not, and (c1) if the print job request should not be refused, allows the print job request and (c2) if the print job request should be refused, refuses the print job request.

If the print job request received from an external device was allowed, the job managing unit 22 performs a print job specified by this print job request. Otherwise, if such a print job request was refused, the job managing unit 22 transmits a response message that indicates the refusal of the print job request to the user terminal apparatus 3 using the network interface 14.

Further, in Embodiment 1, if there is a user 101 who is physically directly using the image forming apparatus 1 when receiving a print job request as mentioned, the job managing unit 22 (a) shows to the user 101 who is physically directly using the image forming apparatus 1 a message that inquires whether the print job request should be refused or not, (b) receives a response to the message, and (c) determines whether the print job request should be refused or not on the basis of the response. Here this message is displayed on the display device 13a, and this response is detected as a user operation by the input device 13b.

Furthermore, in Embodiment 1, if there is a user 101 who is physically directly using the image forming apparatus 1 when receiving a print job request as mentioned, the job managing unit 22 determines whether the aforementioned message should be shown to the user 101 who is physically directly using the image forming apparatus 1 or not on the basis of relationship data that indicates a relationship between the user 101 who is physically directly using the image forming apparatus 1 and a sender user 102 (i.e. a user of the user terminal apparatus 3) of the print job request. In such a case, if it is determined that the aforementioned message should be shown, the job managing unit 22 shows the message; but if it is determined that the aforementioned message should not be shown, the job managing unit 22 does not show the aforementioned message and allows the print job request.

This relationship data is the aforementioned property information, and indicates a user group to which users belong, and for example, the user group is a user group of users who work physically closely to each other. In such a case, the job managing unit 22 may (a) determine whether the sender user 102 is a user who works physically closely to the user 101 who is physically directly using the image forming apparatus 1 or not on the basis of the relationship data, and (b1) if it is determined that the sender user 102 is not a user who works physically closely to the user 101 who is physically directly using the image forming apparatus 1, determine that the aforementioned message should be shown and (b2) if it is determined that the sender user 102 is a user who works physically closely to the user 101 who is physically directly using the image forming apparatus 1, determine that the aforementioned message should not be shown.

Users who work physically closely to each other work within a social distance on a daily basis and it is not necessary to keep a social distance between the users only around the image forming apparatus 1, and therefore, such a user is excluded from a user whose print job request should be refused, and consequently, a print job request from a user who works physically closely to the user 101 is allowed.

Meanwhile, as shown in FIG. 2, the user terminal apparatus 3 includes a network interface 31, a display device 32, an input device 33, a storage device 34, a controller 35, and the like.

The network interface 31 is a network interface for a wireless LAN, a wired LAN or the like.

The display device 32 is an internal device such as a liquid crystal display, that displays an operation screen and the like for a user. The input device 33 is an internal device such as a touch panel or a key board, that detects a user operation. The display device 32 and the input device 33 may be external devices connected to the user terminal apparatus 3.

The storage device 34 is a nonvolatile storage device such as a flash memory and stores a program and data.

The controller 35 controls internal devices in the user terminal apparatus 3 and performs sorts of data processes. The controller 35 includes a computer and executes sorts of programs using the computer, and thereby acts as sorts of processing units. Here the controller 35 acts as a driver 41 for the image forming apparatus 1.

The driver 41 determines a print setting and an image to be printed (i.e. image data) in accordance with a user operation to the input device 33, generates a print job request that specifies the print setting and the image to be printed, and transmits the print job request using the network interface 31 to the image forming apparatus 1.

If the print job request is refused in the image forming apparatus 1, the driver 41 receives a response message that indicates the refusal of the print job request from the image forming apparatus 1 using the network interface 31, and displays the response message on the display device 32.

Figure 3:
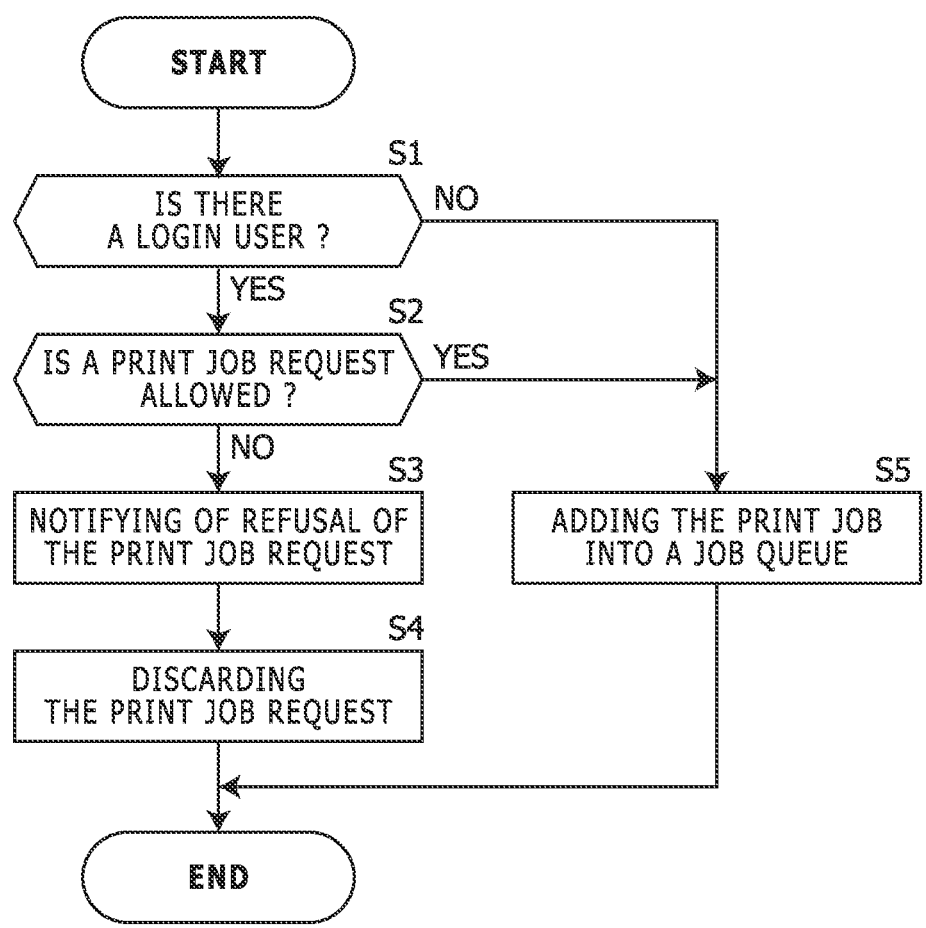
FIG. 3 shows a flowchart that explains a behavior of the image forming apparatus shown in FIGS. 1 and 2.

The following part explains a behavior of the aforementioned image forming apparatus 1. FIG. 3 shows a flowchart that explains a behavior of the image forming apparatus shown in FIGS. 1 and 2.

In the image forming apparatus 1, the job managing unit 22 receives a job request based on a user operation of the user 101 allowed to login by the login processing unit 21, and upon receiving the job request, performs a job specified by the job request.

Further, the job managing unit 22 receives a job request from the user terminal apparatus 3 as an external device, and upon receiving the job request, determines whether the print job request is allowed or refused.

Firstly, the job managing unit 22 determines whether there is a user 101 who is physically directly using this image forming apparatus 1 (i.e. a login user) or not (in Step S1); and if there is a login user, determines whether the print job request is allowed or not in the aforementioned manner (in Step S2).

If the print job request is not allowed, then the job managing unit 22 transmits a response message as a refusal notification of a print job to the user terminal apparatus 3 (in Step S3), and discards the print job request (in Step S4).

Contrarily, if there is not a login user (in Step S1) or the print job request is allowed (in Step S2), then the job managing unit 22 adds the print job request into a job queue, and processes the print job request after other preceding job requests in the job queue have been processed (in Step S5).

As mentioned, in Embodiment 1, when receiving a print job request from the user terminal apparatus 3, the job managing unit 22 (a) determines whether there is a user 101 who is physically directly using the image forming apparatus 1 or not, (b1) if there is not a user 101 who is physically directly using the image forming apparatus 1, allows the print job request and (b2) if there is a user 101 who is physically directly using the image forming apparatus 1, determines whether the print job request should be refused or not, and (c1) if the print job request should not be refused, allows the print job request and (c2) if the print job request should be refused, refuses the print job request.

Consequently, when a user 101 is physically directly using the image forming apparatus 1, a print job request of another user 102 at a remote location is refused if necessary, and therefore, it is restrained that the user 102 comes to the image forming apparatus 1 when the user 101 is physically directly using the image forming apparatus 1.

Embodiment 2

In Embodiment 2, if there is a user 101 who is physically directly using the image forming apparatus 1 when receiving a print job request as mentioned, the job managing unit 22 in the image forming apparatus 1 automatically determines whether the print job request should be refused or not (without the inquiry to the user 101) on the basis of the aforementioned relationship data.

If the relationship data indicates a user group and this user group is a user group of users who work physically closely to each other, then the job managing unit 22 may (a) determine whether the sender user 102 is a user who works physically closely to the user who is physically directly using the image forming apparatus or not on the basis of the relationship data, and (b1) if it is determined that the sender user 102 is not a user who works physically closely to the user 101 who is physically directly using the image forming apparatus 1, determine that the print job request should be refused and (b2) if it is determined that the sender user 102 is a user who works physically closely to the user 101 who is physically directly using the image forming apparatus 1, determine that the print job request should not be refused.

Other parts of the configuration and behaviors of the image forming apparatus 1 in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a communication device configured to perform data communication with an external user terminal apparatus; and
   a job managing unit configured to receive a print job request from the user terminal apparatus using the communication device;
   wherein when receiving the print job request from the user terminal apparatus, the job managing unit (a) determines whether there is a user who is physically directly using the image forming apparatus or not, (b1) if there is not a user who is physically directly using the image forming apparatus, allows the print job request and (b2) if there is a user who is physically directly using the image forming apparatus, determines whether the print job request should be refused or not, and (c1) if the print job request should not be refused, allows the print job request and (c2) if the print job request should be refused, refuses the print job request
   wherein if there is a user who is physically directly using the image forming apparatus when receiving the print job request, the job managing unit (a) shows to the user is physically directly using the image forming apparatus a message that inquires whether the print job request should be refused or not, (b) receives a response to the message, and (c) determines whether the print job request should be refused or not on the basis of the response.

2. The image forming apparatus according to claim 1, wherein if there is a user who is physically directly using the image forming apparatus when receiving the print job request, the job managing unit (a) determines whether the message should be shown to the user who is physically directly using the image forming apparatus or not on the basis of relationship data that indicates a relationship between the user who is physically directly using the image forming apparatus and a sender user of the print job request, and (b1) if it is determined that the message should be shown, shows the message and (b2) if it is determined that the message should not be shown, does not show the message and allows the print job request.

3. The image forming apparatus according to claim 2, wherein the relationship data indicates a user group of users who work physically closely to each other; and the job managing unit (a) determines whether the sender user is a user who works physically closely to the user who is physically directly using the image forming apparatus or not on the basis of the relationship data, and (b1) if it is determined that the sender user is not a user who works physically closely to the user who is physically directly using the image forming apparatus, determines that the message should be shown and (b2) if it is determined that the sender user is a user who works physically closely to the user who is physically directly using the image forming apparatus, determines that the message should not be shown.

4. The image forming apparatus according to claim 1, wherein if there is a user who is physically directly using the image forming apparatus when receiving the print job request, the job managing unit automatically determines whether the print job request should be refused or not on the basis of relationship data that indicates a relationship between the user who is physically directly using the image forming apparatus and a sender user of the print job request.

5. The image forming apparatus according to claim 4, wherein the relationship data indicates a user group of users who work physically closely to each other; and the job managing unit (a) determines whether the sender user is a user who works physically closely to the user who is physically directly using the image forming apparatus or not on the basis of the relationship data, and (b1) if it is determined that the sender user is not a user who works physically closely to the user who is physically directly using the image forming apparatus, determines that the print job request should be refused and (b2) if it is determined that the sender user is a user who works physically closely to the user who is physically directly using the image forming apparatus, determines that the print job request should not be refused.

* * * * *